United States Patent
Houston et al.

(10) Patent No.: US 6,913,003 B2
(45) Date of Patent: Jul. 5, 2005

(54) DIRECT INJECTED ENGINE CONTROL STRATEGY

(75) Inventors: Rodney Alexander Houston, Woodvale (AU); Geoffrey Paul Cathcart, Mount Lawley (AU); Koon Chul Yang, Woodvale (AU)

(73) Assignee: Orbital Engine Company (Australia) PTY Limited, Balcatta (AU)

( * ) Notice: Subject to any disclaimer, the term of this patent is extended or adjusted under 35 U.S.C. 154(b) by 88 days.

(21) Appl. No.: 09/971,013

(22) Filed: Oct. 5, 2001

(65) Prior Publication Data

US 2002/0059915 A1 May 23, 2002

(30) Foreign Application Priority Data

Oct. 5, 2000 (AU) .............................................. PR0612

(51) Int. Cl.[7] .................................................. F02B 7/00
(52) U.S. Cl. ...................................... 123/531; 123/533
(58) Field of Search ................................ 123/531, 533, 123/295, 305, 430, 406.44, 443; 60/285, 286

(56) References Cited

U.S. PATENT DOCUMENTS

| | | | |
|---|---|---|---|
| 4,993,393 A | * | 2/1991 | Hosoda et al. .............. 123/677 |
| 5,408,981 A | | 4/1995 | Tomisawa |
| 5,579,637 A | * | 12/1996 | Yamashita et al. ............. 60/276 |
| 5,768,887 A | * | 6/1998 | Nakamura et al. ............. 60/274 |
| 5,896,839 A | | 4/1999 | Togai |
| 5,934,255 A | | 8/1999 | Dalton et al. |
| 6,345,499 B1 | * | 2/2002 | Nishimura et al. ........... 60/277 |
| 6,434,929 B1 | * | 8/2002 | Nishimura et al. ........... 60/278 |

FOREIGN PATENT DOCUMENTS

| | | |
|---|---|---|
| EP | 0 740 056 A2 | 10/1996 |
| EP | 0 899 442 A2 | 3/1999 |
| EP | 0 943 793 A2 | 9/1999 |

* cited by examiner

*Primary Examiner*—Mahmoud Gimie
(74) *Attorney, Agent, or Firm*—Rothwell, Figg, Ernst & Manbeck

(57) ABSTRACT

A method of operating a direct injected combustion engine having an exhaust system with a conventional three-way catalytic converter, the method including operating the engine with a stoichiometric air/fuel ratio at least substantially across the entire engine operating load range, such that emissions of NOx from the engine are minimised.

29 Claims, 1 Drawing Sheet

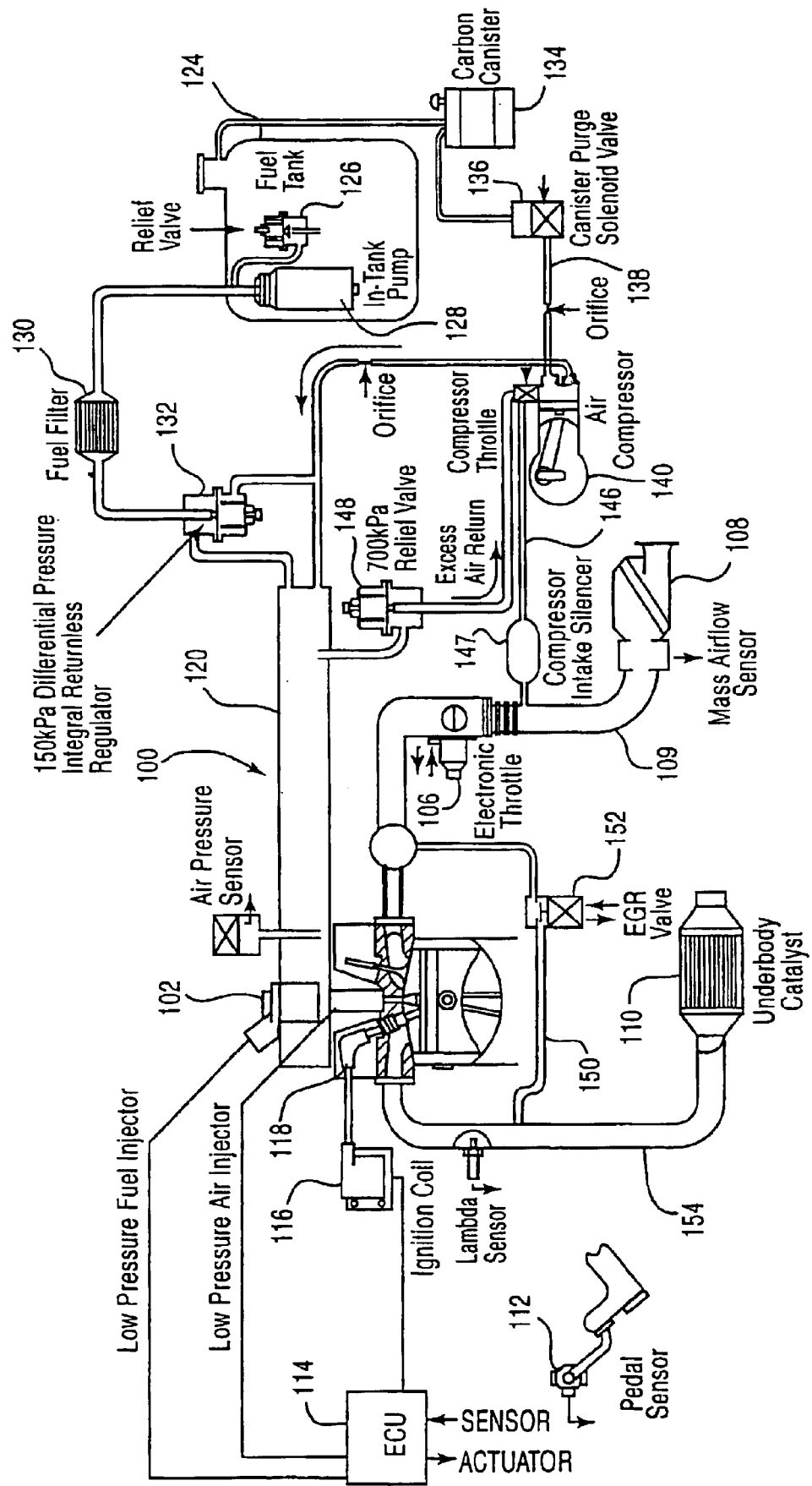

DIRECT INJECTED ENGINE CONTROL STRATEGY

BACKGROUND OF THE INVENTION

1. Field of Invention

The present invention is generally directed at engine control strategies for internal combustion engines, and in particular to engines having direct fuel injection systems. Furthermore, the present invention is equally applicable for both single and dual fluid direct fuel injection systems.

2. Description of the Related Art

A majority of fuel injected engines/vehicles currently produced by the major engine and vehicle manufacturers of the world are of the conventional manifold or port fuel injection (MPI/PFI) type. However, with the ongoing efforts to extract better performance from internal combustion engines and the emerging requirements to meet stringent emission laws, more and more engine manufacturers are investing and developing direct fuel injection engine technologies. Such direct injection (DI) engine technologies are considered by some to be the next evolutionary step for internal combustion engines and examples of automotive vehicles incorporating DI engines are in fact already available to the consumer in certain automotive markets.

Although the progression to DI engine technology may, depending upon the specific engine application, result in some short-term increase in the cost of automotive engines, it is believed that the numerous advantages that DI engines have over MPI/PFI engines will outweigh any such increase in cost. In particular, there are certain emissions and performance benefits which can be realised by adopting a DI fuel system in place of an MPI fuel system.

In regard to emissions benefits, one significant advantage of DI engines over MPI/PFI engines is that, under certain operating conditions, relatively lower exhaust emissions are typically produced by DI engines. This arises in part from the reduced level of wall wetting which generally occurs in a DI engine. As this leads to more of the metered fuel quantity being burned in the combustion chamber of the engine, a noticeable decrease in the production of hydrocarbon (HC) emissions typically results during certain portions of the engine operating load range.

In particular, reduced wall wetting, together with the generally lower crank fuelling required in a DI engine contributes to the reduction of cold start HC emissions. Reduced wall wetting also leads to decreased HC emissions during engine transients and also enables better reinstatement of combustion following cylinder deactivation events, this invariably leading to lower HC emissions.

Almost all current design MPI and DI engines include a catalytic converter or exhaust gas after treatment system of some nature located in the exhaust system of the vehicle. The catalytic converter typically acts to convert undesirable exhaust emissions such as hydrocarbons (HC), carbon monoxide (CO), and oxides of nitrogen (NOx) into non-harmful substances such as carbon dioxide, nitrogen, oxygen and water. As alluded to hereinbefore, the recent and future introduction of increasingly stringent internal combustion engine emissions legislation around the world, such as the proposed US ULEV II & SULEV emissions regulations, has resulted in increasing pressure on engine and vehicle manufacturers to reduce engine emissions. The proposed SULEV emissions are particularly stringent with respect to HC and NOx emissions from vehicles.

In meeting these stringent emissions standards most MPI and PFI vehicles suffer a fuel consumption penalty even though overall tail pipe emission levels decrease. This increase in fuel consumption arises for various reasons including increased engine hardware requirements that serve to increase the level of parasitic loading on the engine, increased fuel consumption due to the catalyst light-off strategies used and an increase in fuel consumption that arises when the engine is calibrated to produce reduced levels of hydrocarbon emissions and NOx emissions.

Insofar as engine performance is concerned, DI engines offer a number of advantages over MPI/PFI engines. For example, better wide-open throttle (WOT) performance can be achieved in DI engines because of the charge cooling effect which is experienced. That is, as there is less wall wetting in a DI engine, a greater quantity of fuel effectively mixes with and vaporizes the air charge in the combustion chamber of the engine. This has the effect of cooling the overall fuel-air charge and hence increasing the volumetric efficiency of the engine which in turn leads to improved full load performance.

This charge cooling effect further serves to reduce the peak temperatures and pressures attained in the combustion chamber and thus leads to a reduction in the tendency for knock to occur. This knock suppression effect in turn reduces the octane sensitivity of the engine such that a wider range of fuels can be utilised with the engine. Alternatively, such characteristics can enable DI engines to operate at higher compression ratios resulting in improved fuel economy.

Still further, the cam timing of a DI engine can be configured to run with a greater degree of valve overlap because of the increased combustion stability provided by a DI engine, in particular when operating with a stratified charge. Such valve overlap is typically used to permit a certain degree of exhaust residuals to be present in the fresh fuel-air charge which, for certain points of the engine operating load range, may provide for reduced pumping work by the engine. Hence, greater overlap may enable the degree of residuals to be increased resulting in better fuel consumption, particularly through the low to mid load ranges.

A further advantage of DI engines over MPI/PFI engines is the increased level of responsiveness of the engine due to the in-cylinder fuel delivery. This effectively results in a reduced degree of lag between the operator requesting a load/speed charge and this change being effected. This leads to improved performance and combustion efficiencies.

There are therefore many advantages to using a DI engine over more conventional MPI/PFI engines in vehicle applications.

In this regard, the Applicant has developed and applied such DI fuel system technology to numerous different engine applications. More specifically, the Applicant has developed and commercialised various air-assist or dual fluid fuel injection systems to inject fuel directly into the combustion chambers of an engine. Such systems typically utilise compressed gas during each injection event to entrain and atomise a metered quantity of fuel for delivery into the combustion chambers of the engine. One such dual fluid injection system is described in the Applicant's U.S. Pat. No. RE36768, the details of which are incorporated herein by reference. Generally, a source of compressed gas, for example an air compressor, is required for these fuel injection systems to operate satisfactorily. The term "air" is used to refer not only to atmospheric air, but may also refer to other gases including air and exhaust gas or fuel vapour mixtures. In operation, such dual fluid fuel injection systems typically rely on the existence of a differential pressure between the fuel which is metered for subsequent delivery and the compressed gas, typically air, which is used to deliver the fuel to the engine. In this regard, it is normal that the fuel pressure is slightly higher than the air pressure such that the fuel may be metered into a volume of compressed gas in a manner akin to that described in U.S. Pat. No. RE 36768.

A significant portion of the current activity taking place in respect of DI engine technology development is in relation to lean burn engines. That is, a number of DI engines currently being developed have the capability to run lean over a significant portion of the engine operating load range, such lean operation allowing significant fuel consumption reductions to be realised. Such DI engines typically operate with a stoichiometric air/fuel ratio throughout a majority of the remaining portion of the engine operating load range. Lean operation is typically associated with the provision of a stratified fuel-air charge in the combustion chamber whilst stoichiometric operation is typically associated with a homogenous fuel-air charge. Both single fluid and dual fluid DI engines can provide a stratified charge, particularly at lower engine loads, which can lead to improved fuel economy and reduced exhaust emissions.

There are however certain challenges to be faced when effecting lean burn operation. In particular, lean operation typically results in the formation of NOx emissions which are more difficult to be reduced by after treatment systems. In this regard, conventional three-way catalytic converters (TWC's) have been found to be unsatisfactory for efficiently treating such NOx emissions produced during such lean burn operation. One present way of addressing this is by incorporating a further Lean NOx Trap (LNT) catalyst which acts to adsorb NOx gases emitted from the engine until the engine conditions are more favourable for the trapped NOx gases to be converted by the exhaust gas treatment system. The favourable engine condition is typically when the engine is operating with a rich or stoichiometric air/fuel ratio. Accordingly, in current systems incorporating an LNT, it has been found necessary for the engine to temporarily run with a rich air/fuel ratio to promote desorption of NOx stored/trapped on the LNT.

There have however been found to exist certain issues with the use of LNTs, not the least of which is added cost. Due to the precious metal loadings necessary on such LNTs, significant cost increases are likely to be incurred for any DI engine incorporating such an LNT. Furthermore and equally prohibitive is the sensitivity of an LNT to sulphur. Currently available fuels typically contain a significant proportion of sulphur which has been found to effectively "poison" an LNT such that after a certain period of time it is no longer effective in trapping and treating NOx. Hence, unless low sulphur fuels can be introduced in certain markets, the use of an engine incorporating an LNT may be seen as being problematic in these markets. In many countries including the United States of America, low sulphur content fuel is still not readily available. It is therefore not possible to effectively use an LNT on vehicles to be driven in the U.S. and other such countries where the emission regulations require strict control of NOx emissions Under these circumstances it would be preferable to be able to operate the DI engine such that it is only necessary to use a conventional catalytic converter such as a TWC without the need for any LNT converter. In this way, the advantages of adopting DI could be immediately realized without the need to address the cost and durability problems associated with an LNT.

SUMMARY OF THE INVENTION

It is therefore an object of the present invention to provide a method of operating a direct injected internal combustion engine that provides for a relatively low level of HC and/or NOx emissions without the need for an LNT converter.

With this in mind, there is provided a method of operating a direct injected internal combustion engine having an exhaust system with a conventional three-way catalytic converter, the method including operating the engine with a stoichiometric air/fuel ratio at least substantially across the entire engine operating load range, such that emissions of NOx from the engine are minimised.

According to another aspect of the present invention, there is provided an electronic control unit for operating a direct injected internal combustion engine having an exhaust system with a conventional three-way catalytic converter, the electronic control unit operating the engine with a stoichiometric air/fuel ration at least substantially across the entire engine operating load range, such that emissions of Nox from the engine are minimized.

By running the engine with a stoichiometric air/fuel ratio (i.e.: $\lambda=1$) over substantially its entire operating load range, optimum conditions are provided for a conventional three-way catalytic converter to treat any NOx emissions which are generated without the need of an LNT converter. The term "conventional three-way catalytic converter" refers to catalytic converters as currently available for use on MPI/PFI engines.

It should be noted that current DI engines using an LNT converter generally need to have periodic rich excursions where the engine is periodically operated with a rich air/fuel ratio. This is required to enable the LNT converter to release the adsorbed NOx for conversion. Such rich excursions typically result in a fuel consumption penalty being incurred as well as an increased level of HC emissions being emitted. Further, a more involved control strategy is typically required to enable such periodic rich excursions to be effected. In contrast, no such rich excursions are required where an LNT converter is not being used.

Whilst operating the engine with a stoichiometric air/fuel ratio at least substantially across the entire operating load range enables the realisation of certain cost and performance benefits, it is possible to extract further benefits, particularly emission benefits, by modifying the engine operation at idle. It is therefore preferable to further operate the DI engine with a lean air/fuel ratio during the idle portion of the operating load range of the DI engine. The DI engine can still operate with a stoichiometric air/fuel ratio during the rest of the operating load range of the engine.

Conveniently, the lean air/fuel ratio (i.e.: $\lambda>1$) at idle is effected by way of a stratified fuel distribution in the combustion chamber. This small period of lean operation will typically result in a relatively low level of NOx emissions being generated by the engine. Due to the fact that lean operation at idle results in a relatively lower level of NOx emissions being produced during this mode of operation and given that reduction efficiencies of the TWC may be low for lean operation, such NOx emissions passing through the exhaust system untreated would not necessarily have a significant impact on the overall emissions produced by the engine during a typical operational cycle.

The use of lean operation at idle can also lead to other operational advantages. For example, it is possible to use the fuelling rate to control torque during such a lean idle mode of operation. A more conventional means of controlling torque would be by controlling the timing of the ignition event. The ability to use fuelling to control torque, as opposed to ignition or airflow, only becomes possible when the engine is run lean enough such that changes in the fuelling rate have a direct influence on torque. The use of the fuelling rate to control torque can also lead to reduced fuel consumption for the engine during normal operation.

Lean operation at idle also offers the ability to lower the idle speed itself which can hence offer a further fuel economy benefit. This is in part due to the improved combustion stability that direct injection and lean operation are able to facilitate. It has been found, for example, that lowering the idle speed of a DI engine by say 150–100 rpm may result in a fuel consumption benefit of some 2% over certain federal drive cycles. A typical MIP/PFI engine operates under warm conditions with an idle speed of 800 rpm whereas idle speeds in the range of 650 RPM to 700 rpm are achievable at idle using a lean burn DI engine.

Still further, the improved combustion stability facilitated by DI and lean operation at idle can lead to certain benefits in regard to enhanced valve timing flexibility. In particular, and as alluded to hereinbefore, greater valve overlap may be possible to provide further improvement to fuel economy at low loads.

To address the issue of a cold catalyst at start-up, an alternative mode of operation is suggested such that the catalyst may very quickly attain its light-off temperature and can hence commence high efficiency conversion of the engine emissions. In this regard, and either as an alternative to operating the engine in a lean mode at idle or together therewith, it is preferable that the engine undergo a "fast light-off" mode of operation to ensure that the catalytic converter is heated to its light-off temperature as soon as possible. Such a mode of operation is described in the Applicant's U.S. Pat. No. 5,655,365, the details of which are incorporated herein by reference. This mode of operation requires, during initial start-up of the engine, retarding the ignition of the charge delivered to at least one cylinder of the engine to after top dead centre in respect of the combustion cycle of said at least one cylinder of the engine and, while said ignition is so retarded, increasing the fuelling rate of said at least one cylinder to a level higher than that required when the engine is operating normally at idle. This assists in increasing the exhaust gas temperature of the engine to thereby heat the catalytic converter quickly to its light-off temperature. The timing of the introduction of the charge into the at least one cylinder may be maintained at before top dead centre. Whilst this U.S. Patent discloses one method of attaining fast catalyst light-off, it is to be appreciated that other suitable methods may possibly be used to facilitate a fast catalyst light-off.

Whilst such a fast light-off mode of operation will typically result in the addition of extra fuel at start-up to increase the engine exhaust gas temperature, it is envisaged that even with the addition of additional fuel, the engine may still run with a slightly lean of stoichiometric air/fuel ratio during the start-up phase of the engine.

The use of such a fast light-off strategy ensures that the catalytic converter can operate efficiently as soon as possible following engine cranking such that the various exhaust emissions including the HC, CO and NOx emissions can be treated as soon as possible by the converter. Hence, even if the engine is not run in a lean mode during idle operation so as to lower the level of exhaust emissions produced by the engine, the TWC in the engine exhaust system is within a short period of time following engine start-up able to satisfactorily treat any emissions produced by the engine. The addition of lean operation at idle then serves to further reduce the overall fuel consumption of the engine as part of its normal operating cycle.

Conveniently, the use of a fast catalytic light-off mode of operation may allow for a lower cost three-way catalytic converter to be used. This, combined with the possibility of lower HC and NOx emissions at start-up and cold operation when compared with conventional MPI/PFI engines, means that the catalytic converter is not required to have the same precious metal loading as for conventional MPI/PFI engines. This in turn may offer greater catalyst packaging flexibility resulting in yet further cost advantages over conventional exhaust treatment systems. These cost benefits alone would be expected to easily out-weigh any cost increase arising from the application of a DI fuel system to the engine. A smaller "capacity" catalytic converter may also lead to lower backpressures leading to improved fuel economy and engine performance.

Furthermore, in current designs of DI engines, it is common practice to utilise an auxiliary air pump to pump air into the exhaust system upstream of the catalytic converter to speed up the time taken for the catalytic converter to reach its light-off temperature. This is typically done to achieve lower tail-pipe emissions and inherently adds further cost and complexity to the exhaust after treatment system, particularly where an LNT converter is also being used in the system. Such an auxiliary air pump is not required where a fast light-off strategy as described above is used and hence the use of such a fast light-off mode of operation may therefore lead to further cost advantages.

Therefore, according to the present invention, a fast light-off mode of operation may be used upon initial start-up of a cold engine whereafter the engine can then operate with a lean air/fuel ratio at idle once the engine has warmed-up and the TWC has reached a satisfactory operating temperature. The DI engine may however continue to operate with a stoichiometric air/fuel ratio during the rest of the load range of the engine. Hence, by operating the engine at $\lambda=1$ for almost the entire operating load range and simply taking advantage of certain benefits at start-up and engine idle, a DI engine operated according to the present invention has the potential to achieve significant emissions, performance and cost benefits over and above those possible from existing MPI/PFI engines.

It is however to be noted that the fast light-off mode of operation and effecting lean operation at idle each enable the realisation of certain different advantages and hence the method of the present invention may be effected with the addition of only one of these alternative features depending upon the particular engine application.

The method of the present invention hence enables a number of benefits to be realised without the need to adopt a more involved engine operating strategy and/or exhaust treatment system. In particular, the aforementioned benefits of DI over MPI/PFI can all be realised. Furthermore, there is no requirement to use an expensive LNT converter and there exists the opportunity to take advantage of significant cost savings in the exhaust treatment system. Such savings are due in part to the possibility of reduced precious metal loadings, catalyst packaging flexibility and the elimination of an auxiliary air pump.

Further, as the method involves the use of a TWC, there is no issue of sulphur poisoning as such TWC's are relatively sulphur tolerant. Still further, as there is no LNT in the exhaust system, there is no requirement to run rich (i.e.: $\lambda<1$) at any operating points and hence the fuel economy and emissions penalties associated with such operation are avoided.

Preferred embodiments of the invention will now be described, by way of example only and with reference to the drawing which is a schematic representation of a direct injection engine utilising an air assisted fuel injection system.

BRIEF DESCRIPTION OF DRAWINGS

FIG. 1 illustrates an engine incorporating a dual fluid fuel injection system.

DETAILED DESCRIPTION OF THE INVENTION

Referring now to the drawing which is a schematic representation of an engine 100 incorporating a dual fluid fuel injection system of the type described in the Applicant's U.S. Pat. No. RE 36768 and PCT Patent Application No. WO 99128621, the contents of which are included herein by reference. Such an air-assist or dual fluid fuel system is particularly conducive to engine operation with a stratified fuel charge at certain engine operating points.

The engine 100 utilises a fuel delivery injector 102 that delivers fuel directly to a combustion chamber of the engine 100. The fuel delivery injector utilises compressed air, supplied by a compressor 140, as a propellant for injecting fuel held in a holding chamber of the delivery injector 102 into the combustion chamber. Typically the delivery injector 102 is in fluid communication a with constant supply of compressed and fuel is metered into a holding chamber within the delivery injector 102. A fuel injector of the type commonly used on MPI/PFI vehicles may be used as a metering device for metering quantities of fuel determined by an electronic control unit 114 to the holding chamber of the delivery injector 102.

Fuel and compressed air are delivered to the delivery injector 102 by either a combined fuel and air supply rail 120 or by a separate fuel supply rail and a separate air supply rail. The fuel and air supply rail 120 is in communication with a fuel supply circuit that includes a fuel tank 124, a fuel pump 128, a fuel pressure relief valve 126, a fuel filter 130 and a differential pressure regulator 132. The fuel and air supply rail 120 is also in communication with an air supply circuit that includes an air compressor 140 that has an air intake line 146 in communication with a silencer volume 147 and an inlet manifold 109 downstream from an air filter box 108. The compressed air supply circuit also includes an air pressure relief valve 148 and also communicates with the differential pressure regulator 132.

The differential pressure regulator 132 regulates the pressure of air and fuel supplied to the air and fuel rail 120 so that the pressure of the fuel is at a predetermined level above the pressure of the compressed air so that the fuel can be metered against the pressure of the compressed air.

The inlet manifold 109 contains and electronic throttle 106 that is actuated by the ECU 114 in response to a driver demand signal provided by an accelerator pedal sensor 112.

A charge of fuel delivered to the combustion chamber by compressed air is ignited at appropriate timings by a spark plug 118 in response to receiving electrical energy generated by an ignition coil 116. The ignition coil is controlled by the ECU 114.

Raw engine exhaust gasses from combustion chambers of the engine 100 are delivered to a TWC 110. The TWC 110 promotes further oxidation of hydrocarbons and carbon monoxide in the exhaust gases so as to lower the level of emissions present in the engine out exhaust gasses before they are passes to atmosphere.

The "air assisted" dual fluid DI engines of the type described in the Applicant's U.S. Patent and PCT patent application enable a number of other advantages to be realised over conventional MPI/PFI engines. For example, such engines have been found to have steady state HC emissions comparable to or lower than MPI/PFI engines. The NOx emissions of such air assisted DI engines are however relatively lower than those produced by MPI/PFI engines.

A system allowing for the purging of fuel vapour from a carbon canister 134 associated with the fuel tank 124 is also provided. A carbon canister purge valve 136 communicates the carbon canister with the compressor 140 via conduit 138. The Applicant has developed such a system which is described in U.S. Pat. No. 5,245,974, the contents of which are included herein by way of reference. When compared to existing MPI/PFI engines, the application of such a vapour purge system on a DI engine operated according to the preferred embodiment would enable vapour to be purged at all speeds and loads, the vapour canister capacity to be advantageously modified, and reduced purge fuelling to be effected at light loads giving improved engine control.

The preferred embodiment may also provide an ability to perform post-oxidation or secondary air injection upstream of the TWC 110 in the exhaust system without the need for an auxiliary air pump or injector in the exhaust system. Such post-oxidation may be used to improve the catalyst efficiency and hence lead to a reduced level of tail-pipe emissions. Typically, the injection of secondary air may be effected by way of a dual injection strategy as discussed in the Applicant's PCT Patent Application No. WO 99/28621.

The engine 100 also utilises Exhaust Gas Re-circulation (EGR) by feeding exhaust gasses from an outlet manifold 154 to the inlet manifold 109 via an EGR conduit 150 and an EGR control valve 152. Use of EGR may provide certain emissions benefits at some load points.

Engines such as the Ford ZETEC four cylinder four stoke engine are suitable for modification so as to incorporate a direct injection fuel system of the type detailed above.

Other advantages such as the possibility of a reduced tumble/swirl requirement leading to improved fuel load performance through increased port flow and greater packaging flexibility for inlet port design may also be realised through the preferred embodiment. Still further, where a dual fluid fuel system is of the spray guided type where ignition can be effected directly off the issuing fuel spray is utilised, a flat top piston may be employed which can lead to advantages of reduced surface area in the combustion chamber, optimized squish and the use of a higher compression ratio.

Importantly, the preferred embodiment allows engines having direct fuel injection to be sold in markets where low sulphur fuel is not readily available. Furthermore, and as alluded to hereinbefore, the cost of an LNT converter is significantly higher than a conventional TWC, and hence this cost can be avoided where the DI engine is operated according to the present invention. Markets expected to have high sulphur fuels include the USA and Canada. The USA has introduced various emissions standards including ULEV, ULEV II & SULEV and with the high sulphur content of US fuel it is preferable that these emissions standards be met without the use of a catalyst with storage capabilities such as a lean NOx trap.

ULEV II emissions standards include the following tail pipe emission requirements for passenger cars and trucks of less than 8500 lbs:

|  | DURABILITY | EMISSIONS |
|---|---|---|
| NMOG | 50,000 miles | 0.040 grams/mile |
|  | 120,000 miles | 0.055 grams/mile |
| NOx | 50,000 miles | 0.050 grams/mile |
|  | 120,000 miles | 0.070 grams/mile |
| CO | 50,000 miles | 1.7 grams/mile |
|  | 120,000 miles | 2.1 grams/mile |

"NMOG" refers to Non-Methane Organic Gases and is broadly equivalent to Hydrocarbon emissions. The ULEV II emissions standards are required to be met when a vehicle is tested over the Federal Test Procedure (FTP 75). Tail pipe emissions are the emissions passed to atmosphere from the tail pipe of a vehicle after final treatment by a catalyst.

In order to the meet ULEV II emissions standard the engine is preferably calibrated to produce raw emissions (i.e. engine out emissions prior to treatment by a catalyst) of NMOG of less than 1.8 grams per mile and NOx of less than 2.2 grams per mile. NMOG in the range of 1.5 to 1.8 grams per mile and NOx in the range of 2.0 to 2.2 grams per mile are believed to be particularly suitable for use with a TWC mounted in close coupled position. Such a TWC will preferably have a cell density of 900 cells per inch or less and with a density of 600 cells per inch being preferred. Such a catalyst would preferably be sulphur tolerant and have a volume of between 90% and 110% of the swept volume of the engine to which it is connected. Some optimisation of the Oxygen Storage Capability of the catalyst may be required to achieve ULEV II depending on the precise engine out emissions treated by the catalyst. The engine may also be calibrated to operate with EGR levels in the range of 15% to 20% by mass for stoichiometric operation under off idle conditions and in the range of 25% to 30% by mass under for lean operation under idle operating conditions.

Whilst the method of the present invention is particularly applicable for use on four stroke cycle engines, it is envisaged that certain benefits may also be obtained by its use on two stroke cycle engines.

Modifications and variations as would be deemed obvious to the person skilled in the art are included within the ambit of the present invention as detailed in the following claims.

We claim:

1. A method of operating a spark-ignited, direct injected combustion engine having an exhaust system with a conventional three-way catalytic converter, the method including operating the engine with a lean-air/fuel ratio during an idle portion of the operating load range of the engine and with a stoichiometric air/fuel ratio at least substantially across the rest of the engine operating load range, such that emissions of NOx from the engine are minimised so as to eliminate the need for a low NOx trap.

2. A method according to claim 1, including further operating the engine at engine start-up in a fast light-off mode of operation whereby the exhaust gas temperature of the engine is increased to thereby heat the catalytic converter quickly to its light-off temperature.

3. A method according to claim 2, wherein the fast light-off mode of operation includes retarding the ignition of the charge delivered to at least one cylinder of the engine to after top dead centre in respect of the combustion cycle of said at least one cylinder, and, while the ignition is so retarded, increasing the fuelling rate of said at least one cylinder to a level higher than that required when the engine is operating normally at idle.

4. A method according to claim 3, wherein the timing of the introduction of the charge into the at least one cylinder is maintained at before top dead centre.

5. A method according to claim 1, wherein the engine includes a dual fluid fuel injection system.

6. A method according to claim 1, wherein the engine is a four stroke cycle engine.

7. A method of operating a spark-ignited direct injected internal combustion engine having an exhaust system with a conventional three-way catalytic converter, the method including operating the engine with a lean air/fuel ratio during an idle portion of the operating load range of the engine; and operating the engine with a stoichiometric air/fuel ratio at least substantially across the rest of the engine operating load range, such that emissions of NOx from the engine are minimised.

8. An electric control unit for operating a spark-ignited, direct injected internal combustion engine having an exhaust system with a conventional three-way catalytic converter, the electronic control unit operating the engine with a stoichiometric air/fuel ratio at least substantially across the entire engine operating load range, such that emissions of NOx from the engine are minimised, so as to eliminate the need for a low NOx trap.

9. An electronic control unit according to claim 8 including operating the engine with a lean air/fuel during an idle portion of the operating load range of the engine.

10. An electronic control unit according to claim 8 or 9, the electronic control unit further operating the engine at engine start-up in a fast light-off mode of operation whereby the exhaust gas temperature of the engine is increased to thereby heat the catalytic converter quickly to its light-off temperature.

11. An electronic control unit according to claim 10, wherein the fast light-off mode of operation includes retarding the ignition of the charge delivered to at least one cylinder of the engine to after top dead centre in respect of the combustion cycle of said at least one cylinder, and, while the ignition is so retarded, increasing the fueling rate of said at least one cylinder to a level higher than that required when the engine is operating normally at idle.

12. An electronic control unit according to claim 11, wherein the timing of the introduction of the charge into the at least one-cylinder is maintained at before top dead centre.

13. An electronic control unit according to claim 8, wherein the engine includes a dual fluid fuel injection system.

14. An electronic control unit according to claim 8, wherein the engine is a four stroke cycle engine.

15. An electronic control unit for operating a spark-ignited, direct injected internal combustion engine having an exhaust system with a conventional three-way catalytic converter, the electronic control unit operating the engine with a lean air/fuel ratio during an idle portion of the operating load range of the engine; and operating the engine with a stoichiometric air/fuel ratio at least substantially across the rest of the engine operating load range, such that emissions of the NOx from the engine are minimised, so as to eliminate the need for a low NOx trap.

16. An internal combustion engine comprising a spark-ignited, direct injection fuel system and adapted to operate with stoichiometric air fuel ratios under off idle operating conditions such that emissions of the NOx from the engine are minimised, so as to eliminate the need for a low NOx trap, and with lean air fuel ratios under idle operating conditions and said engine having an exhaust system comprising a three way catalyst whereby said engine has emissions less than the ULEV II standard when operated over the FTP 75 drive cycle.

17. An internal combustion engine as claimed in claim 16 wherein said catalyst is a close coupled catalyst with a cell density of 900 cells per inch or less.

18. An internal combustion engine as claimed in claim 17 wherein said cell density is 600 cells per inch.

19. An internal combustion engine as claimed in any one of claims 16, 17 or 18 wherein engine is calibrated to produce engine out emissions of NOx of less than 2.2 grams per mile.

20. An internal combustion engine as claimed in any one of claims 16, 17 or 18 wherein said engine is calibrated to produce engine out emissions of NMOG of less than 1.8 grams per mile.

21. An engine as claimed in any one of claims 16, 17, or 18 wherein said engine is calibrated to operate with an average EGR level of between 25% and 30% by mass under idle operating conditions.

22. An engine as claimed in any one of claims 16, 17, or 18 wherein said engine is calibrated to operate EGR by mass under stoichiometric operating conditions of between 15% and 20%.

23. A vehicle having weight less than 8500 lbs and comprising an internal combustion engine with a spark-ignited, direct injection fuel system, the engine adapted to operate with stoichiometric air fuel ratios under off idle operating conditions such that emissions of the NOx from the engine are minimised, so as to eliminate the need for a low NOx trap, and with lean air fuels ratios under idle operating conditions and said vehicle having an exhaust system operatively connected to said engine and comprising a three way catalyst whereby said vehicle has tail pipe emissions less than the ULEV II standard when operated over the FTP 75 drive cycle.

24. A vehicle as claimed in claim 23 wherein said catalyst is a close coupled catalyst with cell density of 900 cells per inch or less.

25. A vehicle as claimed in claim 24 wherein said cell density is 600 cells per inch.

26. A vehicle as claimed in any one of claims 23, 24, or 25 wherein the engine is calibrated to produce engine out emissions of NOx of less than 2.2 grams per mile.

27. A vehicle as claimed in any one of claims 23, 24 or 25 wherein said engine is calibrated to produce engine out emissions of NMOG of less than 1.8 grams per mile.

28. A vehicle as claimed in anyone of claims 23, 24 or 25 wherein said engine is calibrated to operate with an average EGR level of between 25% and 30% by mass under idle operating conditions.

29. A vehicle as claimed in any one of claims 23, 24, or 25 wherein said engine is calibrated to operate with EGR by mass under stoichiometric operating conditions of between 15% and 20%.

* * * * *